United States Patent Office 3,181,063
Patented Apr. 27, 1965

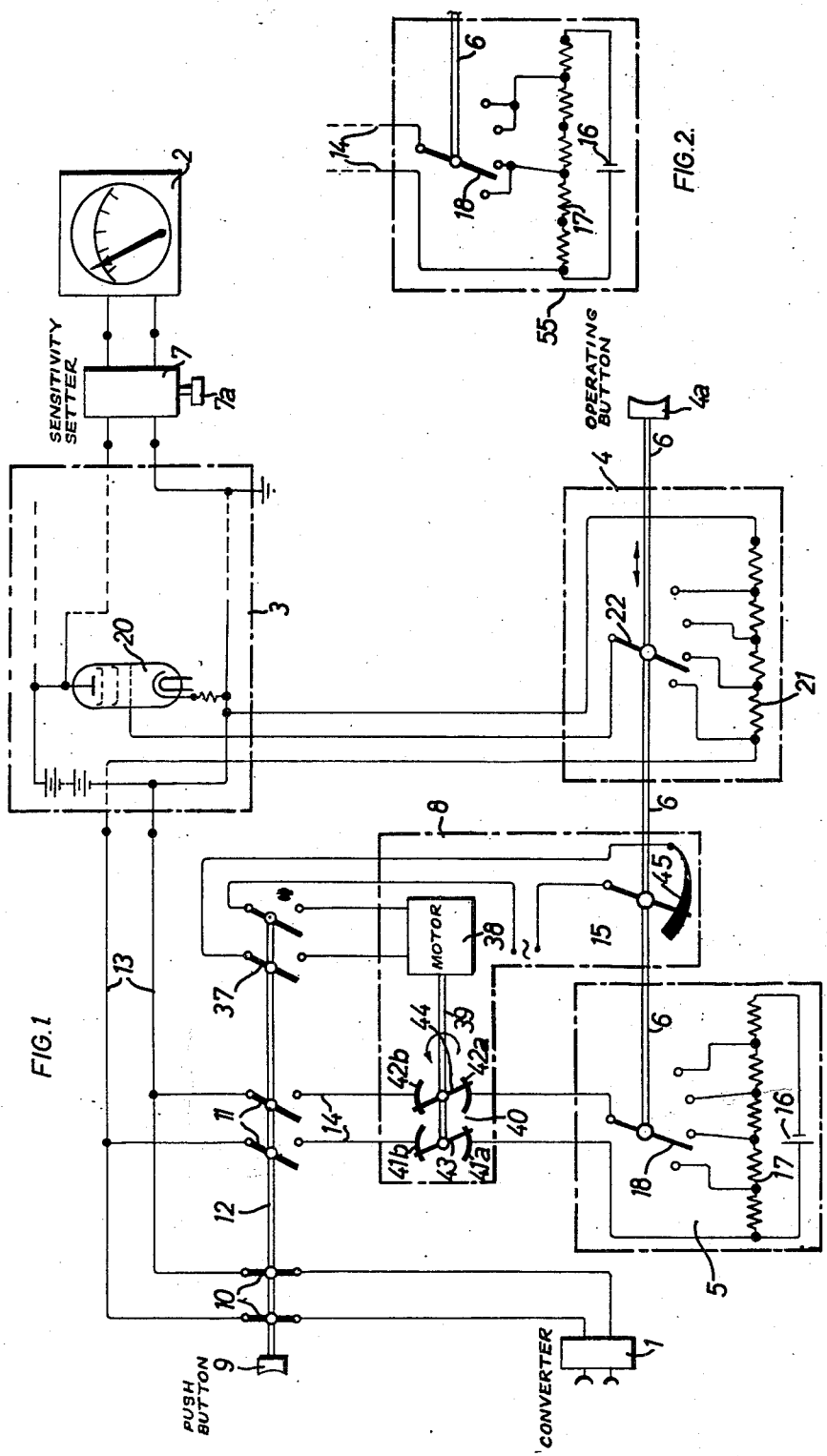

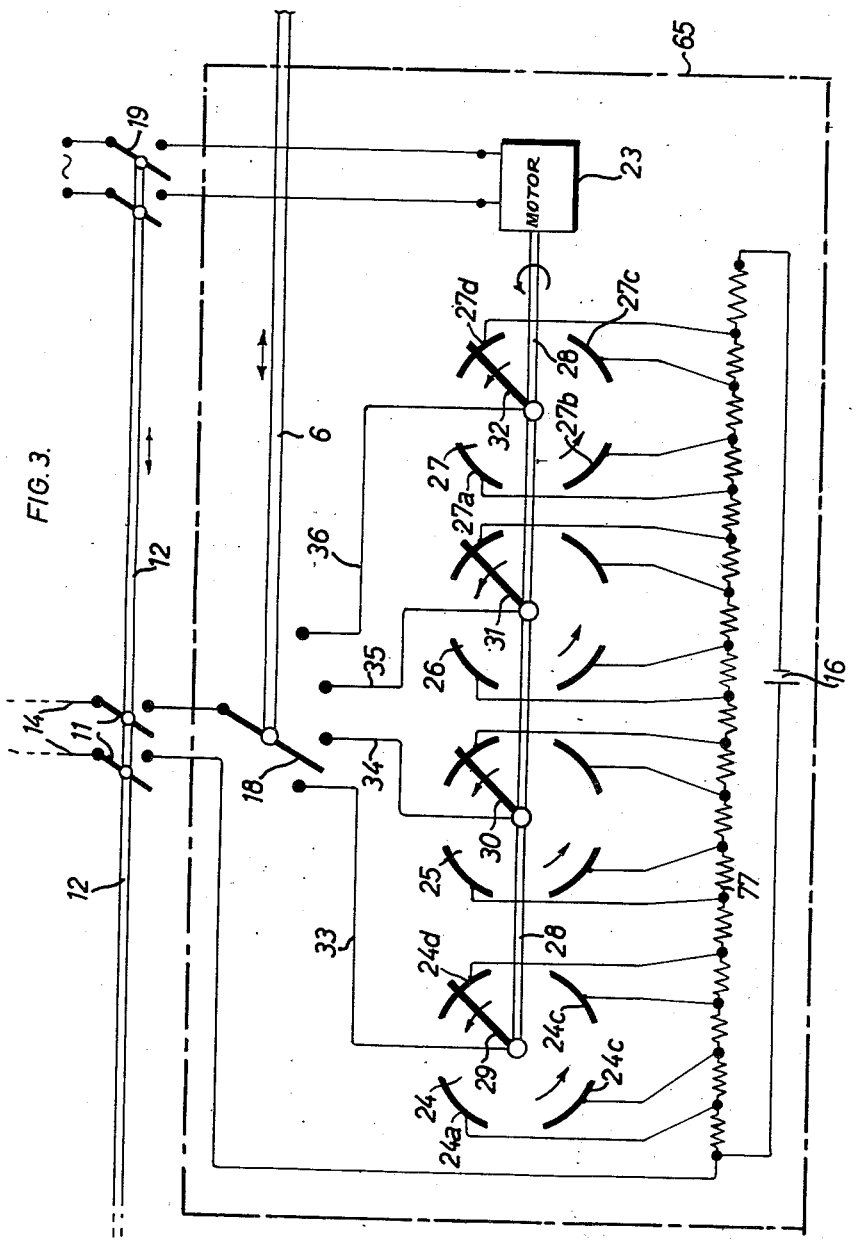

3,181,063
DUAL SENSITIVITY RANGE CALIBRATION APPARATUS EMPLOYING AUTOMATIC SEQUENTIAL SENSITIVITY ALTERNATION
Georg Josef Ullrich, Freiburg im Breisgau, Germany, assignor to Fritz Hellige & Co. G.m.b.H., Freiburg im Breisgau, Germany
Filed Sept. 20, 1960, Ser. No. 57,326
Claims priority, application Germany, Sept. 21, 1959, H 37,492
4 Claims. (Cl. 324—74)

The present invention relates to apparatus for the calibration of measuring and recording devices.

In technical and scientific mensuration, for example in the case of electrical diagnostic apparatus, measuring apparatus for measuring electrical or for measuring non-electrical quantities, such as for example pressures, length variations, temperatures and other data and adapted to deliver the measured quantity as an electrical signal, is frequently connected to recording apparatus in order to obtain a continuous registration of the fluctuations of the quantities measured. In such cases, calibration is necessary to obtain from the amplitude of the recorded tracing produced on a record carrier of the recording apparatus the associated value of the measured quantity usually read from an instrument fitted in the measuring apparatus. Normally, for this purpose, signal voltages corresponding to one or more known values of the quantity being measured are fed to the input of the recording apparatus and the deflection of the recorded member adjusted to a suitable deflection by means of a sensitivity range switch, in which position the switch must remain during the measurement.

It is already known to equip the measuring apparatus with a standard value setter which delivers, when a button is pressed, an electrical signal, corresponding to a predetermined standard value of the quantity being measured, to the recording apparatus so that the calibration demands no appreciable expense and, in the course of a measurement or registration, the marking of the standard value can be very frequently repeated. The latter facilitates subsequent evaluation of the quantity recorded and avoids errors which could arise upon a change in the sensitivity of the recording apparatus during operation.

Such devices are particularly suitable also for measuring non-electrical quantities which are converted into electrical signals. When the production of standard values of the non-electrical quantities to be measured is complicated, an electrical simulator circuit fitted in the measuring device is used and delivers the electrical signal corresponding to predetermined standard values of the quantity to be measured.

The present invention thus concerns measurement and recording apparatus having several different measurement and sensitivity ranges and an important object of the present invention is to achieve a standard calibration value input adapted to each of the sensitivity ranges of the measuring apparatus.

With hitherto known devices for measuring and recording quantities of various kinds and having several sensitivity ranges, the possibility of feeding a standard signal corresponding to a single value of the quantity to be measured was provided which, at the most, was supposed to correspond to the entire range of values of the most sensitive measurement range so that the maximum deflection of the measuring or recording apparatus could not be exceeded and the apparatus damaged thereby.

Assuming linearity, for all measurement ranges the standard to be used was clearly established on the record carrier but in the measurement regions of low sensitivity, the accuracy in the adjustment of sensitivity and in the evaluation of the recording was correspondingly reduced.

Since in many measuring devices sensitivity may vary with the magnitude of the signals, considerable errors of evaluation in the measurement ranges which are inherently less sensitive could be caused by the change of the standard value reading inversely to the change in the range of measurement.

The apparatus of the present invention for calibrating measuring and recording apparatus is characterised, compared to the above, by a coupling between the sensitivity range switch and the standard value setter in such manner that, with the choice of a sensitivity range, the standard value of the quantity to be measured associated therewith is automatically prepared in the standard value setter for feeding into the apparatus.

A further object of the present invention, is to provide means for distinctive characterisation of the standard value of recorded traces associated with the chosen range of measurement. Consequently, in the evaluation of the recorded trace, a clear association of the standard reading relative to the standard value and the determination of the chosen sensitivity range are possible so that further information is not necessary.

The fitting of an apparatus in accordance with the present invention avoids damage which could be caused by errors of operation if an excessive standard value not corresponding to the selected range of measurement were fed to the apparatus.

The invention will be described hereinafter by way of example with reference to the accompanying drawings which are schematic circuit diagrams of one embodiment of a calibration apparatus and two variants thereof.

In the drawings:
FIG. 1 shows the basic circuit construction;
FIG. 2 illustrates one variation of the calibration value setter of the circuit of FIG. 1; and
FIG. 3 illustrates another variation of the calibration value setter of the circuit of FIG. 1.

Referring to FIG. 1, the quantity to be measured is converted in a transducer or converter 1 into an electrical signal and fed to an indicating or recording mechanism 2 through leads 13 and an amplifier 3. By means of a sensitivity range switch 4 having an operating button 4a and acting for example on any suitable component of the amplifier 3, any one of various measurement or sensitivity ranges can be selected. A sensitivity setter 7 having an operating knob 7a and interposed for example between the amplifier 3 and the indicating or registering mechanism 2 serves for the fine adjustment of the desired standard deflection for the appropriate standard value.

In FIG. 1, the amplifier 3 is shown only schematically and one amplifier stage thereof, formed by a pentode 20 is indicated. This stage serves for the adjustment of the sensitivity range. For this purpose either the proportion of feed back can be changed or the input signal to the grid of the pentode can be changed. In the embodiment shown, the input to the control grid is adjustable. Accordingly the sensitivity range setter 4 comprises substantially a potentiometer 21 for the signal voltage applied to the control grid, the potentiometer having four taps for four sensitivity ranges. For this purpose a rotary switch arm 22 is secured to a switch rod 6 which is actuated by the button 4a.

A calibration or standard value setter 5 can be connected through leads 14, the lead 13 and the amplifier 3 to the measuring instrument 2. For feeding the graduated or standard value, a push button member 9 is provided, upon the actuation of which a switch 10 in the electrical signal supply leads 13 is opened and a switch 11 in the standard value supply leads 14 is closed. The embodiment illustrated merely represents the principle of the present invention. In fact there are many ways of feeding a graduated or standard value into a measuring or recording apparatus.

In the embodiment illustrated the switches 10 and 11 are coupled to a common control rod 12 in such manner that the switch 10 in the measurement value supply leads 13 is positively opened when the switch 11 in the calibration value supply leads 14 closes and vice versa.

In accordance with the present invention the measurement range switch 4 is coupled by way of an electrical or mechanical coupling member 6 to the standard value setter 5 in such manner that, automatically with the change over to another sensitivity or measurement range, a graduated or standard value which corresponds thereto is selected for delivery to the measuring or indicating mechanism 2. The corresponding graduated or standard value is generally chosen such that the same reading on the instrument 2 is obtained for each sensitivity range.

A mechanical coupling between the sensitivity range setter 4 and the graduated value setter 5 is used as the bases of the embodiments in the figures. For this purpose not only the rotary switch arm 22 for the sensitivity range regulator but also a rotary switch arm 18 for the graduated value setter 5 is provided on the coupling member 6. The calibration voltage itself is obtained, for example, from a constant voltage source 16 by means of a potential divider 17 according to the desired calibration values, as is usual in the art. Other possibilities, equally well known, of obtaining the calibrated value can also be employed.

In order to associate the standard deflections produced clearly with their measurement and sensitivity ranges and to be able to recognize the latter immediately thereby, the recorded calibration marks are suitably characterised by their special appearance. In the case of a recording with the zero point in the center of the record carrier and with any other standard value or any other sequence of standard values for two different measurement ranges or measurement range groups the characterisation can be obtained by the feature that the direction of the deflection for the two standard values are different. Preferably the switch required for this purpose is firmly coupled to the switch for selecting the measurement range.

In general, for example, the calibration marks can be characterised in that they are interrupted and the length of the remaining parts of the tracing or the intermediate spaces therebetween varies with the range of measurement. For this purpose devices of known kind can be provided which come into operation when the calibration button 9 is actuated. A circuit breaker 8 for example may also be inserted in the leads 14 between the standard value setter 5 and the amplifier 3 for the measurement or recording mechanism 2, which circuit breaker is coupled to the range switch 4 in such manner that the rhythm of interruption is changed in the above-described manner according to the chosen range.

For this purpose, by pressing the calibration button 9 for example not only the switch 11 in the supply leads 14 from the calibrated value setter but also, by means of a switch 37 provided on the control rod 12, the feed circuit of a motor 38 is closed which opens and closes rhythmically an interrupter 40 in the supply leads 14 from the calibrated value setter. The interrupter 4 has two rotary contact arms 43 and 44 are located on a shaft 39 of the motor 38 and establish and break the connection between switch segments 41a and 41b and between switch segments 42a and 42b rhythmically for a predetermined period. The marking characterising sensitivity range is obtained by a varying control frequency, in that the motor speed is changed by an adjustable tapping 15 of a series resistor 45 of the motor 38 coupled to the sensitivity setter. The sensitivity range can then be recognized from the length of the strokes or interruptions of the recorded calibration marks.

Characterisation of the range of the calibration marks is possible in a simple manner by the use of push button switches having wiper contacts if the latter are positively operated accordingly when the range switch 4 is operated.

With the use of the above device for producing sequences of marking signals having in each case several graduated standard values with two measurement ranges or two groups of measurement ranges, a range can be characterised for example if the sequence is run through dependently on the chosen measurement range, in each case in different directions.

A clear, sufficiently exact calibration of the recording apparatus or measuring apparatus in respect of the quantity to be measured is also possible by the formation of the standard value marking according to the present invention. Preferably the standard values of the marking apparatus associated with the appropriate measuring range will be indicated in a suitable manner by suitable shaping and inscription of the operating panel on the measuring or registering apparatus which is fitted with inscribed standard value marking apparatus according to the present invention.

According to requirements a suitable standard reading can be provided for any measurement range or a suitable standard reading for a group of several successive measurement or sensitivity ranges.

In order, for example, to give the same calibrated value to each two successive sensitivity ranges, two successive taps of the potential divider 17 can be combined, as shown in FIG. 2, which illustrates a standard value setter 55 which may be used in place of the standard value setter 5 of FIG. 1, so that each second tap point of the potential divider can be omitted.

A further development of the invention consists in the feature that either the apparatus is provided with several calibration or standard value setters and associated actuating members, such as push buttons or the standard value setter is constructed for holding in readiness several standard values simultaneously which can be fed in by way of various leads 14 by the actuation of push buttons 9 so that, for example, certain fractions of a maximum deflection adapted to the operated measurement range can be supplied in succession. This feature renders possible, supervision of the linearity of the reading in the measuring instrument or recording instrument 2. An automatic device can also be used for the purpose which, for example, triggers a secondary relay when a button is pressed, which relay delivers successively the standard signals associated with the operated measurement range as a sequence of signals.

A simple embodiment of such calibrated value setter 65 is illustrated schematically in FIG. 3. This may be used instead of the calibrated value setter 5 shown in FIG. 1. Four different standard values are associated with each sensitivity range so that the potential divider 77 is sub-divided into seventeen resistance stages. By means of the change over switch 18 which is coupled by the rod 6 to the sensitivity range setter (not shown in FIG. 3) the associated standard value ranges are obtained. The four graduated stages of each of these ranges are operated in turn by means of segment switches 24, 25, 26 and 27 driven by a motor 23 from a common control shaft 28. The supply circuit for the motor 23 is completed when another switch 19, coupled to the control rod 12 for the switch 11 of the graduated value setter, is closed so that the motor is switched on when the calibrating key 9 (not shown in FIG. 3) is pressed and is switched off when the calibrating key is released. Rotary contact arms 29, 30, 31 and 32 of the individual segment contact switches are located on the motor shaft 28 in similar arrangement and thus, with each rotation establish in turn a connection between the associated taps on the range switch 18 and the individual associated calibrated stages on the potential divider 77. For this purpose the contact arms are connected to the switch taps by way of leads 33, 34, 35, 36 and the segments 24a, 24b, etc. to 27c, 27d to the corresponding potential divider tappings.

I claim:

1. In measuring and recording apparatus having at least two sensitivity ranges: the combination comprising a recording instrument for recording electrical signals, first means for selecting from at least two sensitivity ranges the sensitivity of recording of said signals, second means for selectively providing at least two standard calibration signals, wherein one of said standard calibration signals is associated with one of said sensitivity ranges and the other of said standard calibration signals is associated with the other of said sensitivity ranges, control means connected to said first and second means for alternatively controlling said first means to select said one sensitivity range and said second means to provide said one standard calibration signal, or said first means to select said other sensitivity range and said second means to provide said other calibration signal, whereby the appropriate standard calibration signal is selected according to the selected sensitivity range, means for transmitting the selected standard calibrated signal means including an input connected to said transmitting means and an output for rhythmically interrupting the transmission for its output of said selected calibration signal received at its input, means coupling said interrupting means to said sensitivity selecting means for adjusting the frequency of said rhythmic interruptions according to the selected sensitivity range, and means connecting the output of said interrupting means to said recording instrument for applying said rhythmically interrupted selected standard calibration signal to said recording instrument, the frequency of the rhythmic interruptions of said rhythmically-interrupted selected calibration signal enabling the selected sensitivity range to be identified when signals for recording and selected standard calibration signals are applied to said recording instrument.

2. In measuring and recording apparatus having at least two sensitivity ranges: the combination comprising an amplifier for amplifying electrical signals and having a stage with adjustable gain, a recording instrument for recording said amplified electrical signals, a potentiometer in said amplifier having a tap adjustable to at least two tappings for adjusting the gain of said amplifier for selecting the sensitivity of recording of said signals, a constant voltage source, a potentiometer connected thereto, said potentiometer including a tap adjustable to at least two tappings for selectively providing at least two standard calibration signals, an electric motor, a resistor including an adjustable tap for adjusting the speed of said motor, means coupling the taps of said potentiometers and said resistor to one another for movement together whereby the appropriate standard calibration signal and the speed of said motor are selected according to the selected sensitivity range, switch means connected to the output of the second-mentioned potentiometer, said electric motor periodically opening and closing said switch means for periodically interrupting the selected calibration signal, and means for applying said selected interrupted standard calibration signal to said recording instrument.

3. In measuring and recording apparatus having at least two sensitivity ranges: the combination comprising a recording instrument for recording electrical signals, first means for selecting from at least two sensitivity ranges the sensitivity of recording of said signals, second means for selectively providing for each sensitivity range at least two standard calibration signals, means coupling said standard calibration signals, wherein one of said standard calibration signals is associated with one of said sensitivity ranges and the other of said standard calibration signals is associated with the other of said sensitivity ranges, control means connected to said first and second means for alternatively controlling said first means to select said one sensitivity range and said second means to provide said one standard calibration signal, or said first means to select said other sensitivity range and said second means to provide said other calibration signal selected according to the selected sensitivity range, and means for applying said selected standard calibration signals in sequence to said recording instrument.

4. In measuring and recording aparatus having at least two sensitivity ranges: the combination comprising a recording instrument for recording electrical signals, first means for selecting from at least two sensitivity ranges the sensitivity of recording of said signals, a constant voltage source, a potentiometer connected thereto, said potentiometer including tappings for providing a set of at least two standard calibration signals for each sensitivity range, changeover switch means connected to each set of tappings for sequentially providing each signal of the set, an electric motor for operating said changeover switch means, further switch means coupled to said changeover switch means for selecting one of said sets of calibration signals, one of said sets of standard calibration signals being associated with one of said sensitivity ranges and the other of said sets of standard calibration signals being associated with the other of said sensitivity ranges, control means connected to said first means and said further switch means for alternatively controlling said first means to select said one sensitivity range and said further switch means to select said first set of standard calibration signals, or said first means to select said other sensitivity range and said further switch means to select said other sensitivity range whereby the appropriate set of standard calibration signals is selected according to the selected sensitivity range, and means for applying said selected set of standard calibration signals to said recording instrument.

References Cited by the Examiner

UNITED STATES PATENTS

| | | | |
|---|---|---|---|
| 1,363,267 | 12/20 | Porter. | |
| 2,013,393 | 9/35 | Strattner | 324—74 |
| 2,452,614 | 11/48 | Teetsell | 324—74 |
| 3,001,131 | 9/61 | Oliver | 324—74 |

WALTER L. CARLSON, *Primary Examiner.*

SAMUEL BERNSTEIN, *Examiner.*